Feb. 19, 1957   A. D. FERGUSON   2,781,813
TRACTION WHEEL CONSTRUCTION
Filed Feb. 14, 1955   2 Sheets-Sheet 1
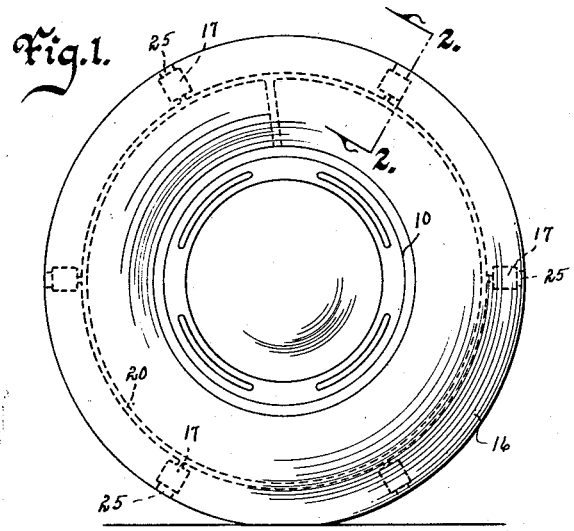
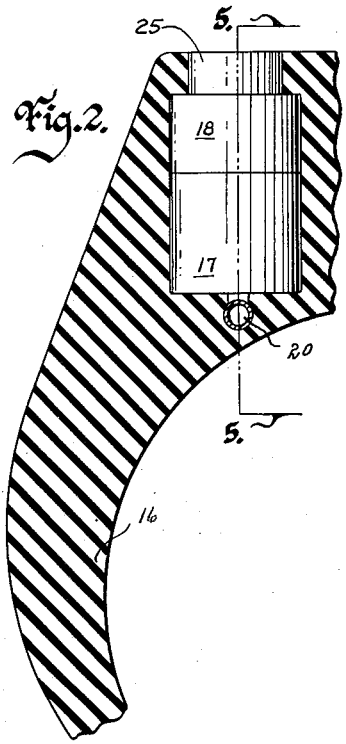
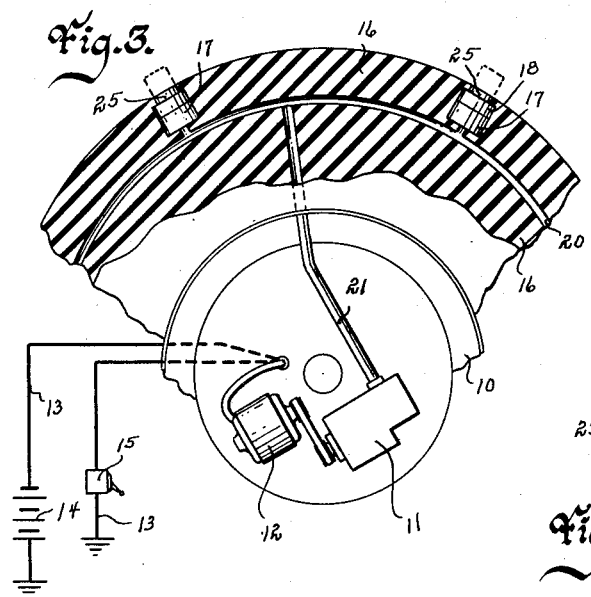
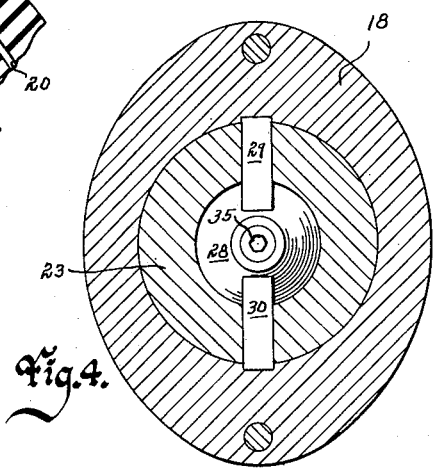
Inventor
Arthur D. Ferguson
by Talbert Dick & Adler
Attorneys
Witness
Edward P. Feeley Feb. 19, 1957 A. D. FERGUSON 2,781,813
TRACTION WHEEL CONSTRUCTION
Filed Feb. 14, 1955 2 Sheets-Sheet 2
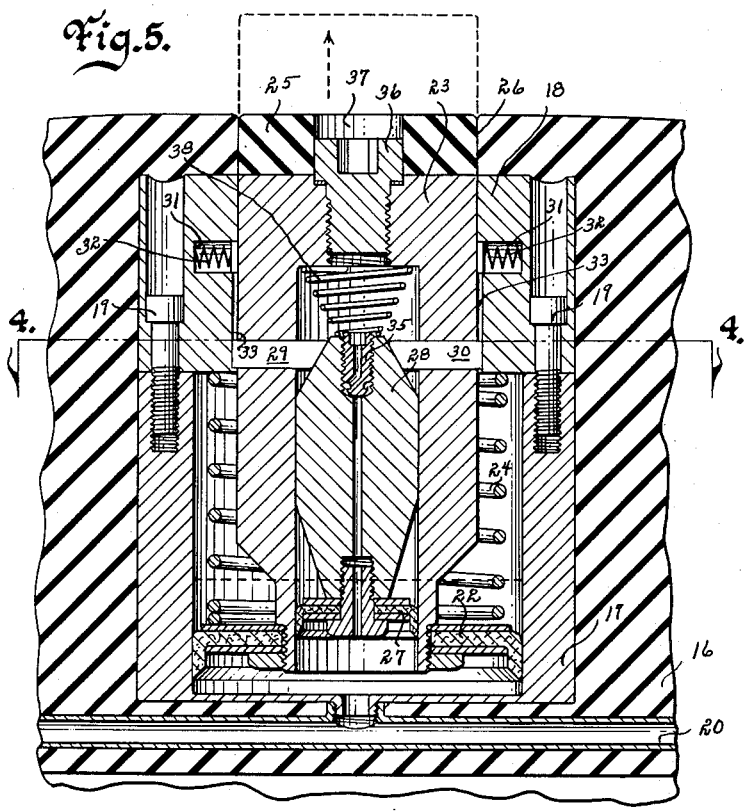
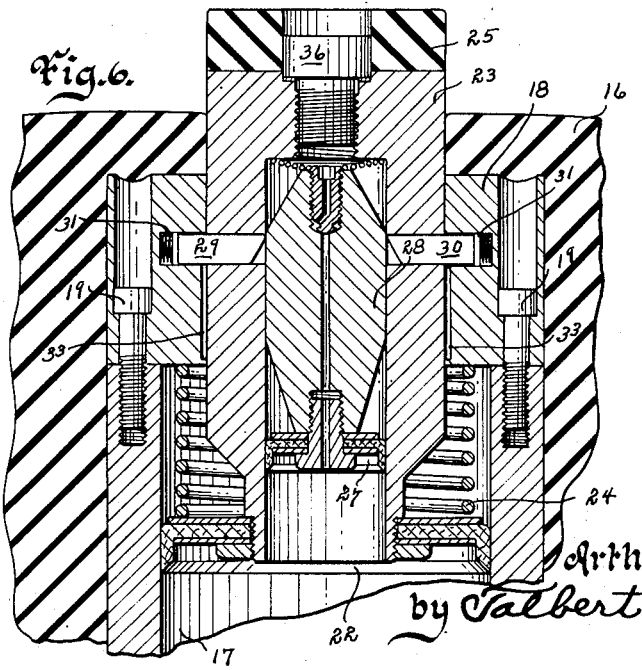
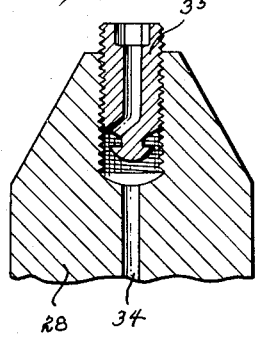
Inventor
Arthur D. Ferguson
by Talbert Dick & Adler
Attorneys United States Patent Office 2,781,813
Patented Feb. 19, 1957

2,781,813

TRACTION WHEEL CONSTRUCTION

Arthur D. Ferguson, Des Moines, Iowa

Application February 14, 1955, Serial No. 487,908

7 Claims. (Cl. 152—208)

This invention relates to wheels on automotive vehicles such as trucks, automobiles and like and more particularly to a controllable means whereby the wheel will have improved traction on the road surface whenever the road condition is such as to require additional traction for preventing wheel slippage.

Snow, ice, mud and like are serious problems to road vehicles and the most common method of combating such hazards is to surround the pneumatic tire with a tire chain. While such chains are reasonably effective they are most difficult to mount around each of the wheels and this is especially true in the case of modern low hung automobiles. Furthermore, it is often impossible to mount the tire chains after the vehicle has once got stuck. Also tire chains are very damaging to the pneumatic tires. Under certain icy conditions a metal tire chain may even cause the vehicle to execute a more violent skidding action than if no chains were being employed. While it is a difficult task to mount the chains, they are equally as hard to remove.

Therefore, one of the principal objects of my invention is to provide an auxiliary traction means mounted into the tire and available for instant use whenever road conditions require it.

A further object of this invention is to provide an automotive vehicle tire that may be used in a normal way when road conditions are favorable and without attention of and interference from its auxiliary traction means.

A still further object of my invention is to provide an auxiliary traction means for road vehicles that may be actuated hydraulically.

A still further object of this invention is to provide an auxiliary traction means for vehicle wheels wherein the portions most readily susceptible to wear can be easily and quickly replaced.

More specifically the object of this invention is to provide an auxiliary traction means for tires that has movable lugs projectible by remote control but capable of being retracted within the plane of the tire proper when not needed.

Still further objects of this invention are to provide an auxiliary traction means for automotive vehicle wheels that is economical to manufacture, durable in use, and refined in appearance.

These and other objects will be apparent to those skilled in the art.

My invention consists in the construction, arrangements and combination, of the various parts of the device, whereby the objects contemplated are attained as hereinafter more fully set forth, specifically pointed out in my claims, and illustrated in the accompanying drawings, in which:

Fig. 1 is a side view of my tire ready for use,

Fig. 2 is an enlarged sectional view of my pneumatic tire taken on line 2—2 of Fig. 1, Fig. 3 is an enlarged side sectional view of a segment of my traction wheel and illustrates its power hook-up, Fig. 4 is a cross sectional view of one of the movable lug units and is taken on line 4—4 of Fig. 5, Fig. 5 is an enlarged sectional longitudinal view of one of the movable lug units and is taken on line 5—5 of Fig. 2, Fig. 6 is an enlarged longitudinal sectional view of the outer portion of one of the movable lug units and more fully illustrates its construction, and Fig. 7 is an enlarged longitudinal sectional view of the air bleed vents of the inner piston of one of the lug units.

In these drawings I have used the numeral 10 to generally designate the wheel of an automotive vehicle. My movable lug units are controllable by air, gas or liquid pressures. Any suitable means may be employed for furnishing such fluid under pressure. In Fig. 3, I show a pump or compressor 11 mounted in the wheel 10 and operated by an ordinary electric motor 12. The numeral 13 designations an electric circuit connecting the motor 12 with a source of electric energy 14. A switch 15 is imposed in this circuit 13 and by using an electric brush connector to get the electric current into the hub of the wheel 10 and into the motor 12, the switch 15 may be located at any position in or on the vehicle such as within the seating compartment of the vehicle. This portion of the device, however, is not important and any suitable method may be used for running the pump or compressor 11 such as a releasable transmission associated with the rotating wheel 10 and the vehicle chassis. As above indicated my invention resides in the tire per se and which I will now describe in detail. I have used the numeral 16 to designate my tire casing. Within the rim portion of this casing 16 I mount a plurality of evenly spaced apart movable lug units as shown in Fig. 1. I will describe the structure of one of these lug units, it being understood that they are all duplicates of each other. The numeral 17 designates the unit outer cylinder. A ring cap 18 is secured by cap screws 19 to the top of the member 17 as shown in Fig. 5. This ring 18 has a diameter less than the inside diameter of the member 17 and these two members 17 and 18 provide the unit housing which is imbedded within the tire 16 as shown in Fig. 2.

So that this housing unit will not rotate relative to the tire its outer shape is elliptical in cross section as shown in Fig. 4. The numeral 20 designates a continuous circular fluid passageway in the tire 16 in communication with the inside bottom of each of the members 17. The pump or compressor 11 has its outlet operatively connected to the inside of this passageway 20 by any suitable means such as a conduit 21 as shown in Fig. 3. The numeral 22 designates a piston slidably mounted in the member 17 and having an outwardly extending hollow post element 23 extending radially and slidably mounted through the ring portion 18. The numeral 24 designates a coil spring within the member 17, embracing the element 23, having one end bearing on the piston 22 and its other end bearing on the inner end of the ring 18 for yieldingly holding the piston 22 in the bottom wheel area of the member 17. The numeral 25 designates a lug portion on the outer free end of the member 23 as shown in Fig. 6. While the housing composed of the members 17 and 18 are embedded in the tire, the member 23 and its outer lug portion 25 are capable of radially sliding through a reduced hole 26 in the tread surface of the tire 16. This traction portion 25 may be of the same material as the member 23 or it may be of a resilient character such as the material in the tread of the tire 16, also it may be of any configuration or design. Each of these lug units comprise a piston within a piston. The numeral 27 designates a piston slidably mounted in the center of the element 23 as shown in Fig. 6. The numeral 28, designating a standard on the outer side of the piston 27, operates within the member 23 and has its forward end portion sharpened and tapered as shown in Fig. 5. The numerals 29 and 30 designate two transversely arranged bars longitudinally slidable through the wall of the member 23. These two bars 29 and 30 are diametrically opposed and each are capable of having its outer end enter and engage a well 31 in the inner wall of the member 18 as shown in Fig. 6. In each well 31 is the coil spring 32 for yieldingly holding the bars 29 and 30 out of the wells 31. When the piston 27 is in lowered position, the outer tapered end of the member 28 will be out of engagement with the bars 29 and 30 thus permitting the springs 32 to hold the bars 29 and 30 out of the wells 31. However, when the member 23 is moved radially outwardly and the bars 29 and 30 are in alignment with the wells 31, the outer sliding of the member 28 will contact the inner sloped ends of the bars 29 and 30 thus forcing them away from each other into the wells 31. This laterally sliding action of the bars 29 and 30 is facilitated by the pointed free end of the member 28 and the sloping and conforming inner ends of the bars 29 and 30. With the bars 29 and 30 within the wells 31, the member 23 will be locked in an extended condition as shown in Fig. 6 and cannot move further outwardly nor can it move inwardly. Longitudinally inwardly from each of the wells 31 and in the inner wall of the member 18, I have provided a key guide 33 for the sliding longitudinal travel of the bars 29 and 30, thereby preventing the independent rotation of the member 23 relative to the member 18. The numeral 34 designates a passageway extending completely through the piston 27 and member 28. The numeral 35 designates a bleed valve threaded into the upper end of the member 28 and communicating with the passageway 34 as shown in Fig. 7. The numeral 36 designates a bleed nut threaded through the outer end of the member 23. A hole 37 in the top of the member 25 exposes this nut 36 for removal or replacement. The numeral 38 designates a coil spring inside the member 23 having one end bearing on the member 23 and its other end contacting the outer free end of the member 28 for yieldingly holding the piston 27 in a contracted inner position.

The practical operation of my device is as follows: When the tire is used in an ordinary manner and the roadway is not hazardous, the switch 15 is on an "off" position and the slidable lug units will be out of the way and in an inoperative position as shown in Fig. 5. However, when it is desired to use the lug means for additional traction the switch 15 is turned to an "on" position. With the circuit 13 completed, the motor 12 will actuate the unit 11 thereby forcing a fluid under pressure into the tire passageway 20. From this passageway 20 the fluid will enter each of the lug units by passing into the bottom of the member 17. This fluid pressure will raise the piston 22 thereby extending the members 23 and 25 beyond the normal periphery of the tire. This outward movement of the member 23 will carry the locking bars 29 and 30 to a position adjacent the wells 31. The fluid pressure will also contact the piston 27 thereby moving the member 28 radially outward thus forcing the bars 29 and 30 into the wells 31 and locking the slidable lug means in an outward expanded condition at which time it will successfully contact and engage the roadway and provide the necessary additional traction for successful and safe driving. When the emergency is over an additional retraction is not required, the switch 15 is then placed on the "off" position. Without pressure being maintained within the device, the spring 38 will move the member 28 radially inwardly and out of holding contact with the bars 29 and 30. At this moment the springs 32 will slide the bars 29 and 30 toward each other and from the wells 31. With the member 23 thus placed in an unlocked expanded condition the spring 24 will push the piston 22 and member 23 radially inwardly bringing the unit from its position shown in Fig. 6 to its inoperative position shown in Fig. 5. If a liquid is used as the pressure agent it may be desirable to bleed the circuit of air pockets and this, of course, is accomplished in the usual manner by placing the means in operation and temporarily removing the nut valves 35 and 36 to permit the escape of the undesirable compressable air pockets. On the other hand, if an air or gas is used this bleeding of the circuit is unnecessary.

From the foregoing it will readily be seen that I have provided an auxiliary traction means for tires that when not in use provides no interference to the normal operation of the tire but when needed provides an instant increased traction.

Some changes may be made in the construction and arrangement of my traction wheel construction without departing from the real spirit and purpose of my invention, and it is my intention to cover by my claims, any modified forms of structure or use of mechanical equivalents which may be reasonably included within their scope.

I claim:

1. In a wheel traction means, a wheel tire, a source of fluid pressure, a movable auxiliary traction lug, comprising, a cylindrical housing inside said wheel tire and radially arranged therewith, a piston element slidably mounted in said cylindrical housing capable of being moved to extend radially outwardly beyond the periphery of said wheel tire, a spring means for yieldingly holding said piston in a radially inwardly position of its sliding movement, a second piston element slidably mounted within said first piston and in communication with the radially inner bottom of said cylindrical housing, a means for operatively connecting the inner bottom of said cylindrical housing with said source of fluid pressure, a lock bar slidably mounted in said first piston element; said cylindrical housing having a well capable of receiving one end of said lock bar for holding said first piston against sliding movement and in a radially outward position, and a means for causing said lock bar to enter said well when said second piston is in a radially outward position.

2. In a wheel traction means, a wheel tire, a source of fluid pressure, a movable auxiliary traction lug, comprising, a cylindrical housing inside said wheel tire and radially arranged therewith, a piston element slidably mounted in said cylindrical housing capable of being moved to extend radially outwardly beyond the periphery of said wheel tire, a spring means for yieldingly holding said piston in a radially inwardly position of its sliding movement, a second piston element slidably mounted within said first piston and in communication with the radially inner bottom of said cylindrical housing, a means for operatively connecting the inner bottom of said cylindrical housing with said source of fluid pressure, a lock bar slidably mounted in said first piston element; said cylindrical housing having a well capable of receiving one end of said lock bar for holding said first piston against sliding movement and in a radially outward position, a spring means in said well for yieldingly urging said lock bar out of said well, and a means for causing said lock bar to enter said well when said second piston is in a radially outward position.

3. In a wheel traction means, a wheel tire, a source of fluid pressure, a movable auxiliary traction lug, comprising, a cylindrical housing inside said wheel tire and radially arranged therewith, a piston element slidably mounted in said cylindrical housing capable of being moved to extend radially outwardly beyond the periphery of said wheel tire, a spring means for yieldingly holding said piston in a radially inwardly position of its sliding movement, a second piston element slidably mounted within said first piston and in communication with the radially inner bottom of said cylindrical housing, a spring means for yieldingly holding said second piston in a radially inwardly position of its sliding movement, a means for operatively connecting the radially inner bottom of said cylindrical housing with said source of fluid pressure, a lock bar slidably mounted in said first piston element; said cylindrical housing having a well capable of receiving one end of said lock bar for holding said first piston against sliding movement.

4. In a wheel traction means, a wheel tire, a source of fluid pressure, a movable auxiliary traction lug, comprising, a cylindrical housing inside said wheel tire and radially arranged therewith, a piston element slidably mounted in said cylindrical housing capable of being moved to extend radially outwardly beyond the periphery of said wheel tire, a spring means for yieldingly holding said piston in a radially inwardly position of its sliding movement, a second piston element slidably mounted within said first piston and in communication with the radially inner bottom of said cylindrical housing, a means for operatively connecting the inner bottom of said cylindrical housing with said source of fluid pressure, a lock bar slidably mounted in said first piston element; said cylindrical housing having a well capable of receiving one end of said lock bar for holding said first piston against sliding movement and in a radially outward position, a means for preventing the independent rotation of said second piston relative to said first piston, and a means for causing said lock bar to enter said well when said second piston is in a radially outward position.

5. In a wheel traction means, a wheel tire, a source of fluid pressure, a movable auxiliary traction lug, comprising, a cylindrical housing inside said wheel tire and radially arranged therewith, a piston element slidably mounted in said cylindrical housing capable of being moved to extend radially outwardly beyond the periphery of said wheel tire, a spring means for yieldingly holding said piston in a radially inwardly position of its sliding movement, a second piston element slidably mounted within said first piston and in communication with the radially inner bottom of said cylindrical housing, a means for operatively connecting the inner bottom of said cylindrical housing with said source of fluid pressure, a lock bar slidably mounted in said first piston element; said cylindrical housing having a well capable of receiving one end of said lock bar for holding said first piston against sliding movement and in a radially outward position, and a cam surface on said second piston element capable of engaging said lock bar and forcing the same into said well when said second piston is moved radially outwardly.

6. In a wheel traction means, a wheel tire, a source of fluid pressure, a movable auxiliary traction lug, comprising, a cylindrical housing inside said wheel tire and radially arranged therewith, a piston element slidably mounted in said cylindrical housing capable of being moved to extend radially outwardly beyond the periphery of said wheel tire, a spring means for yieldingly holding said piston in a radially inwardly position of its sliding movement, a second piston element slidably mounted within said first piston and in communication with the radially inner bottom of said cylindrical housing, a means for operatively connecting the inner bottom of said cylindrical housing with said source of fluid pressure, a lock bar slidably mounted in said first piston element; said cylindrical housing having a well capable of receiving one end of said lock bar for holding said first piston against sliding movement and in a radially outward position, and a cam surface on said second piston element capable of engaging said lock bar and forcing the same into said well when said second piston is moved radially outwardly; said cylindrical housing being imbedded in the tread area of said tire wheel, and said first piston element extending into an opening in the tread area of said tire wheel, said opening having a diameter less than the diameter of said cylindrical housing.

7. In a wheel traction means, a wheel tire, a source of fluid pressure, a movable auxiliary traction lug, comprising, a cylindrical housing inside said wheel tire and radially arranged therewith, a piston element slidably mounted in said cylindrical housing capable of being moved to extend radially outwardly beyond the periphery of said wheel tire, a spring means for yieldingly holding said piston in a radially inwardly position of its sliding movement, a second piston element slidably mounted within said first piston and in communication with the radially inner bottom of said cylindrical housing, a means for operatively connecting the inner bottom of said cylindrical housing with said source of fluid pressure, a lock bar slidably mounted in said first piston element; said cylindrical housing having a well capable of receiving one end of said lock bar for holding said first piston against sliding movement and in a radially outward position, and a cam surface on said second piston element capable of engaging said lock bar and forcing the same into said well when said second piston is moved radially outwardly; said cylindrical housing having a non-round outer character and being imbedded in the tread area of said tire wheel, and said first piston element extending into an opening in the tread area of said tire wheel, said opening having a diameter less than the diameter of said cylindrical housing.

References Cited in the file of this patent

UNITED STATES PATENTS

| | | |
|---|---|---|
| 2,480,548 | Carhart | Aug. 30, 1949 |
| 2,672,908 | Donegan | Mar. 23, 1954 |
| 2,708,470 | Gramelspacher | May 17, 1955 |